(No Model.)
F. S. SMITH.
SAW SWAGE.
No. 254,715. Patented Mar. 7, 1882.
Fig. 1.
Fig. 2.
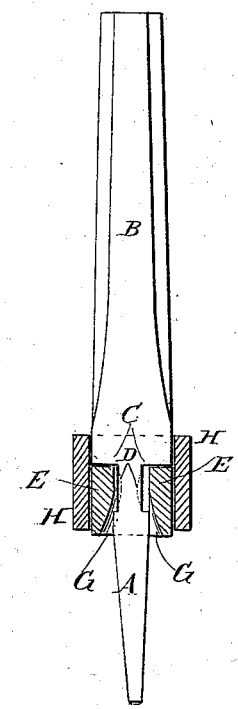
Fig. 3.
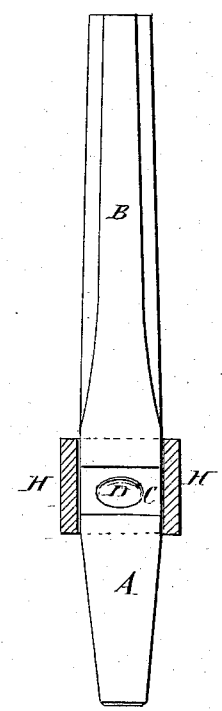
Fig. 6.
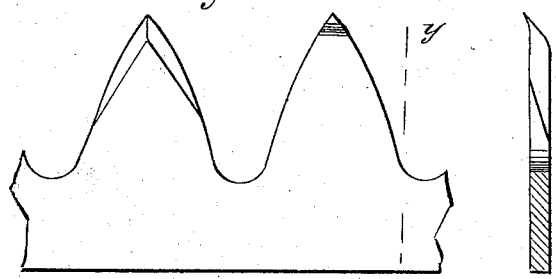
Fig. 7.
Fig. 5.
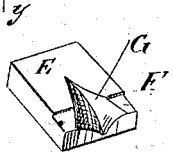
Fig. 4.
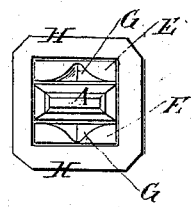
WITNESSES:
Chas Nida.
C. Sedgwick.
INVENTOR:
F. S. Smith
BY Munn & Co
ATTORNEYS.

UNITED STATES PATENT OFFICE.

FURMON S. SMITH, OF WOODVILLE, MICHIGAN.

SAW-SWAGE.

SPECIFICATION forming part of Letters Patent No. 254,715, dated March 7, 1882.

Application filed May 25, 1881. (No model.)

*To all whom it may concern:*

Be it known that I, FURMON S. SMITH, of Woodville, in the county of Newaygo and State of Michigan, have invented a new and useful Improvement in Saw-Swages, of which the following is a specification.

Figure 1 is a side elevation of my improvement. Fig. 2 is an edge elevation of the same, partly in section, through the line $x\,x$, Fig. 1. Fig. 3 is a side elevation of the same, partly in section. Fig. 4 is a front end view of the same. Fig. 5 is a perspective view of one of the notched side pieces. Fig. 6 is a side view of a portion of a saw. Fig. 7 is a cross-section of the same, taken through the line $y\,y$, Fig. 6.

Similar letters of reference indicate corresponding parts.

The object of this invention is to facilitate setting and swaging the teeth of cross cut and other saws, and promote accuracy in the set and shape of the teeth.

The invention consists in constructing a saw set and swage with a handle, a center piece formed upon the handle and having a groove and a recess upon each side, side pieces placed upon the opposite sides of the center piece and having shoulders and angular notches upon their inner sides, and the band that fastens the side pieces to the center piece and handle, whereby the teeth of a saw can be brought to a uniform and accurate set and shape, as will be hereinafter fully described.

A is the body or center piece of the saw set and swage, which is formed upon the forward end of the handle B, and is tapered upon its opposite sides and edges toward its forward end, as shown in Figs. 1, 2, and 3. Upon the opposite sides of the center piece, A, at the forward end of the handle B, are formed wide and shallow cross-grooves C, with shallow concaves D in the middle parts of the bottoms of the said grooves C. Into the angles between the sides of the center piece, A, and the forward end of the handle B are fitted blocks or side pieces, E, which have shoulders F formed upon their inner sides to fit into the grooves C of the said center piece, A. In the inner sides of the forward ends of the side pieces, E, are formed tapered angular notches G to receive the saw-teeth. The notches G extend past the shoulders F to allow the points of the saw-teeth to pass the shoulders of the grooves C and enter the recesses D. The shoulders F are intended, in combination with the band H, to hold the blocks E in the recesses C. They have no other function. The side pieces, E, are secured in place by a band, H, driven upon them and upon the forward end of the handle B, as shown in Figs. 1, 2, 3, and 4. The groove C and recess D upon one side of the center piece, A, are made deeper than the groove and recess upon the other side of the said center piece, so that the tool can be used to give a finer or coarser set to the saw-teeth, as may be required.

In using the saw set and swage the saw is placed in some suitable support, with the teeth upward. The tool is then placed successively upon the saw-teeth, and one or more blows with a hammer upon the end of the handle B properly swage the teeth at the time they are set. With this construction the saw-teeth are upset in bringing them to a set, so that they will keep their set and will not be liable to be straightened out should the saw be pinched in the wood. After the teeth have been set and swaged they may be rubbed upon the wood side with a stone or file to sharpen them, and the saw will then cut as well as if it had been filed.

Having thus fully described my invention, I claim as new and desire to secure by Letters Patent—

1. A saw set and swage, substantially as herein shown and described, formed of the handle B, the center piece, A, having grooves C and recesses D upon its opposite sides, the side pieces, E, having shoulders F and angular notches G, and the band H, as set forth.

2. A saw setting and swaging device consisting of the handle B and center piece, A, having the grooves and recesses C and D deeper on one side than on the other, the notched blocks E, having shoulders F, and the band H, whereby saw-teeth may be swaged and set, substantially as shown and described.

FURMON S. SMITH.

Witnesses:
S. A. NICKLASSON,
J. F. DARLY.